United States Patent
Huang et al.

(10) Patent No.: US 11,031,980 B2
(45) Date of Patent: Jun. 8, 2021

(54) METHOD AND APPARATUS FOR FORMING POWER-EFFICIENT DIGITAL-ANALOG HYBRID BEAM IN MULTI ANTENNA SYSTEM, AND DEVICE

(71) Applicant: SOUTHEAST UNIVERSITY, Jiangsu (CN)

(72) Inventors: Yongming Huang, Jiangsu (CN); Jianjun Zhang, Jiangsu (CN)

(73) Assignee: SOUTHEAST UNIVERSITY, Jiangsu (CN)

( * ) Notice: Subject to any disclaimer, the term of this patent is extended or adjusted under 35 U.S.C. 154(b) by 0 days.

(21) Appl. No.: 16/612,761

(22) PCT Filed: Sep. 11, 2018

(86) PCT No.: PCT/CN2018/104918
§ 371 (c)(1),
(2) Date: Nov. 12, 2019

(87) PCT Pub. No.: WO2020/000655
PCT Pub. Date: Jan. 2, 2020

(65) Prior Publication Data
US 2021/0067207 A1    Mar. 4, 2021

(30) Foreign Application Priority Data
Jun. 27, 2018 (CN) .......................... 201810678642.5

(51) Int. Cl.
*H04B 7/0426* (2017.01)
(52) U.S. Cl.
CPC ................... *H04B 7/043* (2013.01)
(58) Field of Classification Search
CPC ........ H04L 25/03949; H04L 25/03834; H04B 1/16
See application file for complete search history.

(56) References Cited

U.S. PATENT DOCUMENTS 10,492,161 B2*  11/2019  Kim ................... H04W 72/046
2010/0272211 A1*  10/2010  Ohwatari ............ H04B 7/0691
375/295

(Continued)

FOREIGN PATENT DOCUMENTS

| CN | 106972876 | 7/2017 |
| CN | 107395255 | 11/2017 |
| WO | 2015147445 | 10/2015 |

OTHER PUBLICATIONS

"International Search Report (Form PCT/ISA/210) of PCT/CN2018/104918," dated Feb. 27, 2019, pp. 1-4.

*Primary Examiner* — Vineeta S Panwalkar
(74) *Attorney, Agent, or Firm* — JCIPRNET

(57) ABSTRACT

The invention discloses a method and an apparatus for forming a power-efficient digital-analog hybrid beam in a multi-antenna system, and a device. The method includes the following steps. Perform mathematical modeling on a beam forming design firstly to construct a beam forming optimization problem that minimizes ripples in a main lobe and a side lobe. Convert an original optimization problem into an a constraint-separable optimization problem using a penalty function method. Perform iterative solution finally using a block coordinate descent method. The beam designed by the invention has a small peak-to-average ratio, a power amplification efficiency of a power amplifier is very high, and a limited resolution characteristic of the phase shifter is considered. The ripples in the main lobe and the side lobe of the beam designed are very small and a transition band is very narrow.

19 Claims, 3 Drawing Sheets

Perform mathematical modeling on a hybrid beam forming design to acquire a corresponding optimization problem, the optimization problem comprising a power constraint, a fluctuation constraint and a phase constraint of a phase shifter

↓

Replace a product of the analog radio frequency matrix and the digital baseband vector in the constraint conditions of the optimization problem by a new optimization variable, transfer a corresponding equality constraint to a target function using a penalty function method, introduce a multiplier variable for the equality constraint, and convert an original optimization problem into an augmented Lagrange penalty function problem

↓

Convert nonconvex constraints of lower bounds of the constraint of the transmit power of each antenna and the constraint of the fluctuation in the main lobe into convex constraints, and use a BCD method to solve the optimization problem after conversion

(56) References Cited

U.S. PATENT DOCUMENTS

2013/0051486 A1     2/2013   Pi et al.
2017/0134202 A1*   5/2017   Baligh ................ H04L 27/2614

\* cited by examiner

Perform mathematical modeling on a hybrid beam forming design to acquire a corresponding optimization problem, the optimization problem comprising a power constraint, a fluctuation constraint and a phase constraint of a phase shifter Replace a product of the analog radio frequency matrix and the digital baseband vector in the constraint conditions of the optimization problem by a new optimization variable, transfer a corresponding equality constraint to a target function using a penalty function method, introduce a multiplier variable for the equality constraint, and convert an original optimization problem into an augmented Lagrange penalty function problem Convert nonconvex constraints of lower bounds of the constraint of the transmit power of each antenna and the constraint of the fluctuation in the main lobe into convex constraints, and use a BCD method to solve the optimization problem after conversion

FIG.1

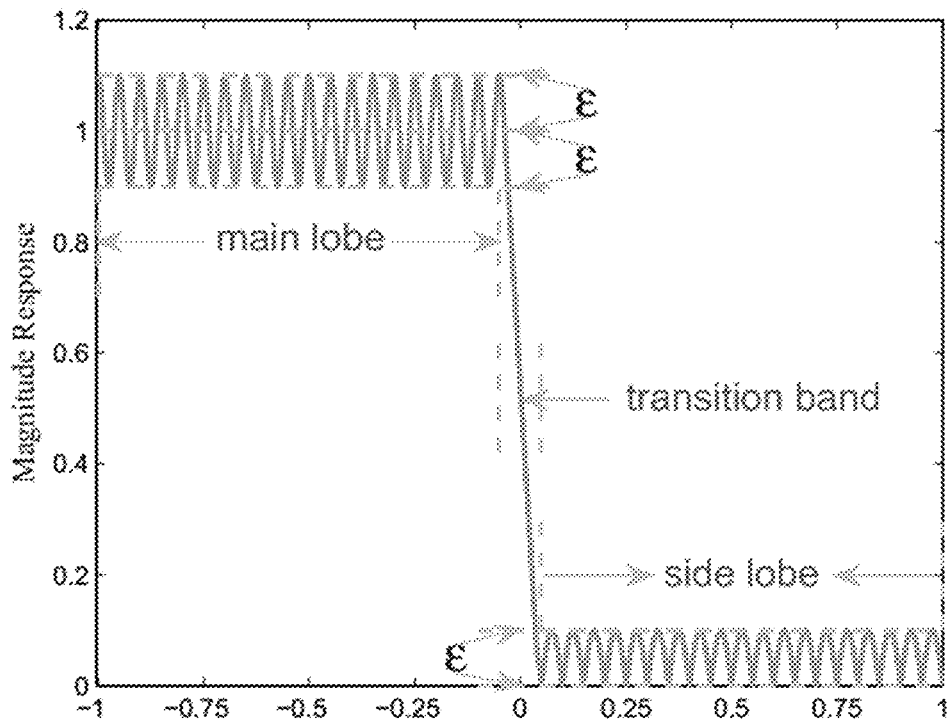

FIG.2

METHOD AND APPARATUS FOR FORMING POWER-EFFICIENT DIGITAL-ANALOG HYBRID BEAM IN MULTI ANTENNA SYSTEM, AND DEVICE

CROSS-REFERENCE TO RELATED APPLICATION

This application is a 371 of international application of PCT application serial no. PCT/CN2018/104918, filed on Sep. 11, 2018, which claims the priority benefit of China application no. 201810678642.5, filed on Jun. 27, 2018. The entirety of each of the above mentioned patent applications is hereby incorporated by reference herein and made a part of this specification.

TECHNICAL FIELD

The present invention belongs to the field of wireless communication and radar technologies, and relates to wireless communication and radar systems in which a large planning antenna array is used in a transmitting/receiving end, and more particularly, to a method and an apparatus for forming a power-efficient digital-analog hybrid beam in a multi-antenna system, and a device.

BACKGROUND

With the continuous development of wireless communication technology, high-speed data service and ubiquitous access demand are explosively increased. The next generation 5G mobile communication technology will have higher requirements on capacity, energy consumption and bandwidth. By using a (large-scale) multi-antenna array at a transmitting end or a receiving end, a spectrum efficiency of a communication system can be greatly improved using a simple signal processing technology. Therefore, the multi-antenna array has very important significance in the communication system. For millimeter wave communication, in order to compensate for a large path loss using antenna array gain, the large-scale multi-antenna array is even more necessary. The multi-antenna array not only is of great significance to the communication system, but also is of great significance to the radar system, because the use of more antennas can further improve the spatial resolution and better suppress the interference.

The multi-antenna array can effectively improve the system performance, but it also increases the difficulty of system design and puts forward higher requirements on related hardware. Taking the millimeter wave communication as an example, compared with the traditional microwave frequency band, a communication distance and a covering range are very limited due to higher frequency and larger path loss of millimeter wave signals. The path loss needs to be compensated by the array gain provided by the large-scale antenna array, and a transmit rate and a transmit quality of the system are further improved by using digital-analog hybrid beam forming and space division multiplexing technologies. The beam forming design plays a central role in the communication and radar systems, and channel estimation, high-resolution arrival direction estimation, array gain acquisition, interference suppression, multi-user communication (such as precoding), etc. all depend on efficient beam forming design. Therefore, the beam design has attracted great attention and received extensive and in-depth research both in an industrial circle and an academic circle.

Although the beam forming design has received in-depth research, various beam forming design methods have been proposed, and better performance has been achieved, some extremely important problems have not been effectively solved. First of all, although very good beam performance can be acquired by a beam pattern approaching technology, such as small ripples in a main lobe and a side lobe, a very narrow transition band, and acquisition of consistent beam alignment performance, different antennas may have very large transmit power difference or peak-to-average ratio (PAPR), so that a large dynamic range of a power amplifier is required, thus putting forward very high requirements on hardware. Moreover, the large dynamic range of the power amplifier means that a power efficiency of the power amplifier is very low. Secondly, it is very difficult for the millimeter wave system to completely perform precoding in a digital domain. Therefore, analog-digital hybrid precoding is usually performed based on a digital-analog hybrid structure, and analog precoding is realized by a phase shifter. According to the current beam forming design method, a digital beam is firstly designed according to a given index or requirement, digital-analog hybrid mapping (i.e., mapping of a designed digital beam forming vector into an analog precoding matrix and a digital precoding vector) is executed under the condition that a phase rotator has an infinite resolution, and each phase shifter is quantized using a nearest distance quantization method. However, a quantization accuracy of the actual phase rotator is limited, the existing beam design algorithm is used, transmit powers of antennas corresponding to the designed beams are greatly different, and when a quantization bit number is small (e.g., 4 bits) and the traditional nearest distance quantization method is used, the beam performance is very seriously degraded.

SUMMARY

Object of the present invention: aiming at the problems existing in the prior art, the present invention is intended to provide a method and an apparatus for forming a power-efficient digital-analog hybrid beam in a multi-antenna system, and a device, which can effectively reduce a peak-to-average ratio of transmit powers of different antennas and improve a power amplification efficiency of a power amplifier.

Technical solution: in order to achieve the object of the present invention above, the following technical solution is employed in the present invention.

A method for forming a power-efficient digital-analog hybrid beam in a multi-antenna system comprises the following steps of:

(1) performing mathematical modeling on a hybrid beam forming design to acquire a corresponding optimization problem, the optimization problem comprising three groups of constraint conditions, wherein a first group of constraint conditions is that a value of a transmit power of each antenna is taken in a specified range, a second group of constraint conditions is that values of ripples in a main lobe and a side lobe are taken in a specified range, and a third group of constraint conditions is that a phase value of each phase shifter is taken in a specified set, and an optimization object is to minimize the ripples in the main lobe and the side lobe, and acquire a corresponding analog radio frequency matrix and a digital baseband vector of the hybrid beam forming by solving the optimization problem;

(2) replacing a product of the analog radio frequency matrix and the digital baseband vector in the constraint conditions of the optimization problem by a new optimization variable, transferring a corresponding equality constraint to an objective function using a penalty function method, introducing a multiplier variable for the equality constraint, and converting an original optimization problem into an augmented Lagrange penalty function problem; and (3) using a constrained concave-convex procedure (CCCP) method to convert nonconvex constraints of lower bounds of the constraint of the transmit power of each antenna and the constraint of the ripple in the main lobe in the optimization problem acquired in step (2) into convex constraints, and using a block coordinate descent (BCD) method to solve the optimization problem after conversion.

As a preferred embodiment, the using the BCD method to solve the optimization problem converted in the step (3) comprises: fixing other optimization variables, constructing and solving a first sub-problem taking the analog radio frequency matrix as the optimization variable; fixing other optimization variables, constructing and solving a second sub-problem taking the digital baseband vector as the optimization variable; fixing other optimization variables, constructing and solving a third sub-problem taking the new optimization variable introduced and a ripple control variable as the optimization variables; and alternately solving the three sub-problems above, updating the multiplier variable and a penalty parameter, and performing iteration until convergence or a specified number of iterations is met.

As a preferred embodiment, the objective function of the optimization problem acquired in the step (2) is:

$$\min_{A,f,d,\varepsilon} \varepsilon + \frac{1}{2\rho}\|f - Ad + \rho u\|^2$$

wherein $\varepsilon$ is a ripple control variable, f is the new optimization variable introduced, A and d are respectively the analog radio frequency matrix and the digital baseband vector, $\rho$ is a penalty parameter, and u is the multiplier variable introduced.

As a preferred embodiment, a constraint condition of the first sub-problem constructed in the step (3) is that a phase value of each phase shifter is taken in a specified set, and an objective function is:

$$\min_{A} \|f - Ad + \rho u\|^2$$

wherein f is the new optimization variable introduced previously, A and d are respectively the analog radio frequency matrix and the digital baseband vector, and u is the multiplier variable introduced.

As a preferred embodiment, the second sub-problem constructed in the step (3) is:

$$\min_{d} \|f - Ad + \rho u\|^2$$

wherein f is the new optimization variable introduced previously, A and d are respectively the analog radio frequency matrix and the digital baseband vector, and u is the multiplier variable introduced.

As a preferred embodiment, constraint conditions of the third sub-problem constructed in the step (3) are a power constraint and a ripple constraint after constraint conversion, and an objective function is:

$$\min_{f,\varepsilon} \varepsilon + \frac{1}{2\rho}\|f - Ad + \rho u\|^2$$

wherein $\varepsilon$ is the ripple control variable, f is the new optimization variable introduced, A and d ar±e respectively the analog radio frequency matrix and the digital baseband vector, $\rho$ is the penalty parameter, and u is the multiplier variable introduced.

An apparatus for forming a power-efficient digital-analog hybrid beam in a multi-antenna system for implementing the method for forming a power-efficient digital-analog hybrid beam in a multi-antenna system above comprises:

a model initialization module configured to perform mathematical modeling on a hybrid beam forming design to acquire a corresponding optimization problem, the optimization problem comprising three groups of constraint conditions, wherein a first group of constraint conditions is that a value of a transmit power of each antenna is taken in a specified range, a second group of constraint conditions is that values of ripples in a main lobe and a side lobe are taken in a specified range, and a third group of constraint conditions is that a phase value of each phase shifter is taken in a specified set, and an optimization object is to minimize the ripples in the main lobe and the side lobe, and acquire a corresponding analog radio frequency matrix and a digital baseband vector of the hybrid beam forming by solving the optimization problem;

an optimization problem conversion module configured to replace a product of the analog radio frequency matrix and the digital baseband vector in the constraint conditions of the optimization problem by a new optimization variable, transfer a corresponding equality constraint to an objective function using a penalty function method, introduce a multiplier variable for the equality constraint, and convert an original optimization problem into an augmented Lagrange penalty function problem; and an optimization problem solution module configured to use a CCCP method to convert nonconvex constraints of lower bounds of the constraint of the transmit power of each antenna and the constraint of the ripple in the main lobe in the optimization problem acquired by the optimization problem conversion module into convex constraints, and use a BCD method to solve the optimization problem after constraint conversion.

As a preferred embodiment, the optimization problem solution module comprises:

a first solution unit configured to fix other optimization variables, construct and solve a first sub-problem taking the analog radio frequency matrix as the optimization variable;

a second solution unit configured to construct and solve a second sub-problem taking the digital baseband vector as the optimization variable;

a third solution unit configured to construct and solve a third sub-problem taking the new optimization variable introduced and a ripple control variable as the optimization variables; and an iteration control unit configured to sequentially call the three solution units above to solve and update the multiplier variable and a penalty parameter in each iteration until the iteration is converged or a specified number of iterations is met.

A computer device comprises a memory, a processor and a computer program stored on the memory and executable on the processor, wherein when the computer program is loaded on the processor, the method for forming a power-efficient digital-analog hybrid beam in a multi-antenna system is implemented.

Beneficial effects: the method and apparatus for forming a power-efficient digital-analog hybrid beam suitable for wireless communication and radar systems provided by the present invention can meet various application requirements in different fields, and have the following the beneficial effects.

(1) The method for forming a power-efficient digital-analog hybrid beam disclosed by the present invention can meet various requirements, in which not only a beam with a wider main lobe can be designed to rapidly scan a whole beam space, but also a beam with a narrower main lobe can be designed to acquire higher array gain.

(2) Power amplifiers corresponding to the beam designed in the present invention have a very small transmit power difference, so that the peak-to-average ratio is very small and the power amplification efficiency of the power amplifier is very high. Although a normalized transmit power of each antenna is strictly limited, the designed beam still has a good performance, i.e., the ripples in the main lobe and the side lobe are very small and a transition band is very narrow.

(3) The method for forming a hybrid beam disclosed by the present invention can process various constraints on the phase value of the phase shifter, comprising the case where continuous phase values are taken (infinite accuracy) and the case where discrete phase values are taken (finite accuracy), and when a quantization accuracy is very low, very good beam performance can be acquired.

BRIEF DESCRIPTION OF THE DRAWINGS

FIG. 1 is a flowchart of a method for forming a power-efficient digital-analog hybrid beam according to an embodiment of the present invention.

FIG. 2 is a diagram of beam design/optimization in an embodiment of the present invention.

DETAILED DESCRIPTION

Figure 3:
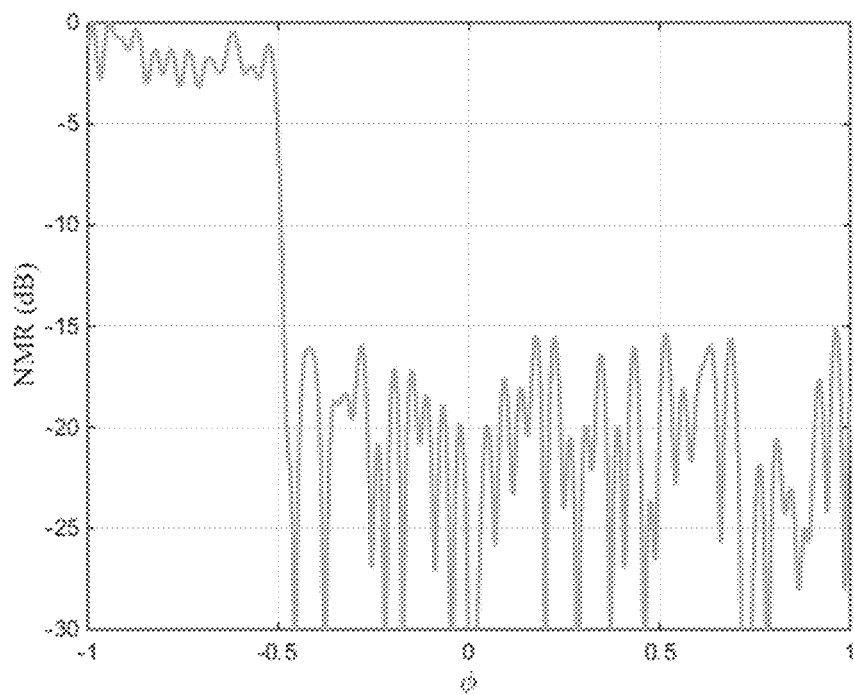
FIG. 3 illustrates a normalized magnitude response of a beam designed in an embodiment of the present invention.

The present invention is further described below with reference to the drawings and the embodiments.

As shown in FIG. 1, an embodiment of the present invention discloses a method for forming a power-efficient digital-analog hybrid beam in a multi-antenna system, the method is suitable for multi-antenna array communication and radar systems, and the method comprises the following steps of: performing mathematical modeling on a hybrid beam forming design firstly to acquire a corresponding optimization problem, the optimization problem comprising a power constraint, a ripple constraint and a phase constraint of a phase shifter; replacing a product of an analog radio frequency matrix and a digital baseband vector in the constraint conditions of the optimization problem by a new optimization variable, transferring a corresponding equality constraint to an objective function using a penalty function method, introducing a multiplier variable for the equality constraint, and converting an original optimization problem into an augmented Lagrange penalty function problem; and converting nonconvex constraints of lower bounds of the constraint of the transmit power of each antenna and the constraint of the ripple in the main lobe into convex constraints finally, and using a BCD method to solve the optimization problem after conversion. The specific steps are as follows.

In step (1), mathematical modeling is performed on a hybrid beam forming design to acquire a corresponding optimization problem.

In the step, an index of a beam to be designed is determined according to application requirements, and relevant input parameters comprise: 1) a number of array antennas N and a number of radio frequency chains K; 2) a main lobe $\mathcal{J}_M$, a side lobe $\mathcal{J}_S$ and a transition band $\mathcal{J}_T$; 3) sampling accuracies in the main lobe and the side lobe (a recommended value for a uniform linear array is 0.5/N); 4) a set $\mathcal{S}$ of phase values (discrete or continuous) of each phase shifter that can be taken; and 5) a dynamic range of a transmit power of a power amplifier corresponding to each antenna, especially a point or range with a highest power amplifier efficiency, and a normalized transmit power $c_i (i=1, \ldots, N)$ (for a certain actual transmit power value) and a robustness control parameter $\delta_i > 0$ determined according to the dynamic range of the transmit power of each power amplifier. It shall be pointed out that the normalized transmit power $\{c_i\}$ of each power amplifier may be different because different types of power amplifiers are allowed to be used.

For an analog-digital hybrid antenna array structure, the designed beam can be represented as Ad, wherein A represents an analog radio frequency part (a matrix dimension is N×K), and d represents a digital baseband part (a vector dimension is K×1). Since A is implemented by the phase shifter, each element of A can be represented as $A(m,n) = e^{jx_{m,n}}(x_{m,n} \in \mathcal{S} \subset \mathcal{R})$, wherein j represents an imaginary unit, $\mathcal{S}$ represents a set of values of the phase shifter that can be taken, and $\mathcal{R}$ represents a set of all real numbers. A set of antenna arrays is recorded as $\mathcal{N} = \{1, 2, \ldots, N\}$, and a normalized transmit power of an $i^{th}$ antenna is set as $c_i$.

Generally speaking, the ripples in the main lobe and the side lobe of the beam expected to be designed are as small as possible, and a basic idea of designing a beam in the present invention is to constrain that a preset value of the power amplifier corresponding to each antenna is taken, and minimize the ripples in the main lobe and the side lobe. Mathematically, the designed beam Ad can be modeled as the following optimization problem:

$$\min_{A,d,\varepsilon} \varepsilon \; |e_i^H Ad| = c_i, \, (i \in \mathcal{N}) \quad (1)$$

$$\text{s.t. } 1 - \varepsilon \leq |a_T^H(\phi)Ad| \leq 1 + \varepsilon, \, (\phi \in \mathcal{J}_M)$$

$$|a_T^H(\phi)Ad| \leq \varepsilon, \, (\phi \in \mathcal{J}_S)$$

$$A(m,n) = e^{jx_{m,n}}, \, (x_{m,n} \in \mathcal{S} \subset \mathcal{R}),$$

wherein $e_i = (0_{i-1}, 1, 0_{N-i})$ represents a unit vector in Euclidean space, i.e., an $i^{th}$ element is 1, and other elements are 0. $a_T(\phi)$ represents an antenna array steering vector, and a specific representation form depends on an antenna array form. For example, for a uniform linear array, $a_T(\phi)$ is as follows:

$$a_T(\phi) = \frac{1}{\sqrt{N}}[1, e^{j\phi}, e^{j2\phi}, \ldots, e^{j(N-1)\phi}].$$

wherein $\phi=2\pi d/\lambda$ (d and $\lambda$ respectively represent a distance between adjacent antennas and a signal wavelength). A geometric meaning of the optimization problem (1) is as shown in FIG. 2.

The power amplifier cannot strictly output a specified power in practice, and in order to improve a robustness of the designed beam, the normalized transmit power is relaxed to a small interval $[c_i-\delta_i, c_i+\delta_i]$ taking $c_i$ as a center, and the ripples in the main lobe and the side lobe are minimized. Mathematically, the optimization problem (1) can be further written as:

$$\min_{A,d,\varepsilon} \varepsilon \quad c_i - \delta_i \le |e_i^H Ad| \le c_i + \delta_i, (i \in \mathcal{N}) \quad (2)$$
$$\text{s.t.} \quad 1 - \varepsilon \le |a_T^H(\phi)Ad| \le 1 + \varepsilon, (\phi \in \mathcal{J}_M)$$
$$|a_T^H(\phi)Ad| \le \varepsilon, (\phi \in \mathcal{J}_S)$$
$$A(m, n) = e^{jx_{m,n}}, (x_{m,n} \in \mathcal{S} \subset \mathcal{R}).$$

By sampling the main lobe and the side lobe, an optimization problem with infinite constraints is converted into an optimization problem with finite constraints. Specifically, since $\mathcal{J}_M$ and $\mathcal{J}_S$ are continuous or uncountable, $\mathcal{J}_M$ and $\mathcal{J}_S$ shall be discretized or sampled, and $\mathcal{J}_M$ and $\mathcal{J}_S$ are respectively discretized into $\mathcal{D}_M = \{\phi_1, \phi_2, \ldots\}$ and $\mathcal{D}_S = \{\phi'_1, \phi'_2, \ldots\}$ according to specified sampling accuracies, and then a corresponding optimization problem can be rewritten as:

$$\min_{A,d,\varepsilon} \varepsilon \quad c_i - \delta_i \le |e_i^H Ad| \le c_i + \delta_i, (i \in \mathcal{N}) \quad (3)$$
$$\text{s.t.} \quad 1 - \varepsilon \le |a_T^H(\phi)Ad| \le 1 + \varepsilon, (\phi \in \mathcal{D}_M)$$
$$|a_T^H(\phi)Ad| \le \varepsilon, (\phi \in \mathcal{D}_S)$$
$$A(m, n) = e^{jx_{m,n}}, (x_{m,n} \in \mathcal{S} \subset \mathcal{R}).$$

To sum up, the optimization problem modeled in the step comprises three groups of constraint conditions, and a first group is corresponding to a power constraint condition, i.e., a value of a transmit power of each antenna is taken in a specified range, which can be mathematically represented as:

$$c_i - \delta_i \ge |e_i^H Ad| \ge c_i + \delta_i, (i \in \mathcal{N}).$$

A second group is corresponding to a ripple constraint condition, i.e., values of the ripples in the main lobe and the side lobe are taken in a specified range, which can be mathematically represented as:

$$1-\varepsilon \ge |a_T^H(\phi)Ad| \ge 1+\varepsilon, (\phi \in \mathcal{D}_M) \quad |a_T^H(\phi)Ad| \le \varepsilon, (\phi \in \mathcal{D}_S).$$

A third group is corresponding to a constraint on a phase value of a phase shifter, which can be mathematically represented as:

$$A(m,n)=e^{jx_{m,n}}(x_{m,n} \in \mathcal{S}).$$

An optimization object is to minimize the ripples in the main lobe and the side lobe, and acquire an analog part A* and a digital part d* of a hybrid beam forming vector.

In step (2), coupling formed by multiplication of an analog part and a digital part is processed by introducing a new optimization variable and an equality constraint, and a penalty function method is further used to process the equality constraint. Since an analog part A and a digital part d in the optimization problem (3) are coupled (in a product form), the product form of A and d leads to extreme difficulties in direct optimization of A and d. Therefore, the new optimization variable and the corresponding equality constraint are introduced to acquire a new optimization problem equivalent to the original optimization problem. However, the introduction of the equality constraint also brings new difficulties. Therefore, the penalty function method is considered to be used to transfer the introduced equality constraint to an objective function. In order to process an ill-conditioning caused by a very small penalty parameter, a corresponding multiplier (dual) variable is considered to be introduced for the equality constraint to acquire an augmented Lagrange penalty function problem. Specifically, in the embodiment, decoupling of the analog part and the digital part is mainly divided into three sub-steps.

In step (2.1), the new optimization variable and the corresponding equality constraint are introduced to construct a new optimization problem, and the new optimization problem is equivalent to the original optimization problem.

In step (2.2), in order to process the new equality constraint introduced, the penalty function method (which is usually a quadratic penalty function method) is used to transfer the equality constraint to the objective function.

In step (2.3), in order to process the ill-conditioning that may occur when the penalty parameter tends to zero, the multiplier (dual) variable is introduced to acquire the augmented Lagrange penalty function problem.

A solution thought in the step is explained in detail below based on mathematical representation.

In a first step, the coupling of the analog part and the digital part in the product form is processed, a new optimization variable f is introduced, and f=Ad is set to acquire the following new optimization problem:

$$\min_{A,f,d,\varepsilon} \varepsilon \quad c_i - \delta_i \le |e_i^H f| \le c_i + \delta_i, (i \in \mathcal{N}) \quad (4)$$
$$1 - \varepsilon \le |a_T^H(\phi)f| \le 1 + \varepsilon, (\phi \in \mathcal{D}_M)$$
$$\text{s.t.} \quad |a_T^H(\phi)f| \le \varepsilon, (\phi \in \mathcal{D}_S)$$
$$f = Ad$$
$$A(m, n) = e^{jx_{m,n}}, (x_{m,n} \in \mathcal{S} \subset \mathcal{R}).$$

It can be proved that the optimization problem (4) is equivalent to the original optimization problem (3).

In a second step, in order to process the new equality constraint f=Ad introduced, the quadratic penalty function method is used to transfer the new equality constraint to the objective function to acquire the following optimization problem:

$$\min_{A,f,d,\varepsilon} \varepsilon + \frac{1}{2\rho}\|f - Ad\|^2 \quad (5)$$
$$c_i - \delta_i \le |e_i^H f| \le c_i + \delta_i, (i \in \mathcal{N})$$

-continued $$\text{s.t. } 1-\varepsilon \le |a_T^H(\phi)f| \le 1+\varepsilon, (\phi \in \mathcal{D}_M)$$

$$|a_T^H(\phi)f| \le \varepsilon, (\phi \in \mathcal{D}_S)$$

$$A(m,n) = e^{jx_{m,n}}, (x_{m,n} \in \mathcal{S} \subset \mathcal{R}).$$

It shall be noted that when the penalty parameter ρ is very small (tending to 0), the corresponding optimization problem is most likely ill-conditioned.

In a third step, in order to process the ill-conditioning caused by the very small penalty parameter, a multiplier (dual) variable u is introduced for the equality constraint f=Ad to acquire the following augmented Lagrange penalty function problem:

$$\min_{A,f,d,\varepsilon} \varepsilon + \frac{1}{2\rho}\|f - Ad\|^2 + Re(u^H(f - Ad)) \quad (6)$$

$$c_i - \delta_i \le |e_i^H f| \le c_i + \delta_i, (i \in \mathcal{N})$$

$$\text{s.t. } 1-\varepsilon \le |a_T^H(\phi)f| \le 1+\varepsilon, (\phi \in \mathcal{D}_M)$$

$$|a_T^H(\phi)f| \le \varepsilon, (\phi \in \mathcal{D}_S)$$

$$A(m,n) = e^{jx_{m,n}}, (x_{m,n} \in \mathcal{S} \subset \mathcal{R}).$$

It can be verified that the optimization problem (6) is equivalent to the following optimization problem:

$$\min_{A,f,d,\varepsilon} \varepsilon + \frac{1}{2\rho}\|f - Ad + \rho u\|^2 \quad (7)$$

$$c_i - \delta_i \le |e_i^H f| \le c_i + \delta_i, (i \in \mathcal{N})$$

$$\text{s.t. } 1-\varepsilon \le |a_T^H(\phi)f| \le 1+\varepsilon, (\phi \in \mathcal{D}_M)$$

$$|a_T^H(\phi)f| \le \varepsilon, (\phi \in \mathcal{D}_S)$$

$$A(m,n) = e^{jx_{m,n}}, (x_{m,n} \in \mathcal{S} \subset \mathcal{R}).$$

In step (3), a CCCP method is used to convert nonconvex parts (i.e., lower bounds of the power constraint) of the constraint of the transmit power of each antenna into convex constraints. Similarly, nonconvex parts of the constraint of the ripple in the main lobe (i.e., lower bounds of the ripple constraint) are converted into convex constraints. A BCD method is further used to solve the optimization problem after conversion. Specifically, the solution of the optimization problem in the embodiment is mainly divided into two sub-steps.

(3.1) The CCCP method is used to convert the nonconvex parts (i.e., the lower bounds of the power constraint) of the constraint of the transmit power of each antenna into the convex constraints, and the nonconvex parts of the constraint of the ripple in the main lobe (i.e., the lower bounds of the ripple constraint) are converted into the convex constraints, thus facilitating the solution by the BCD method.

(3.2) The BCD method is used to solve the optimization problem after conversion, which is mainly decomposed into three sub-problems, and specific optimization problems and optimization variables are as follows.

(3.1.1) When a first sub-problem solved by the BCD method is to fix other optimization variables, the value of each phase shifter is optimized, and the corresponding optimization problem can be further solved by the BCD method.

(3.1.2) When a second sub-problem solved by the BCD method is to fix other optimization variables, the digital part of the hybrid beam is optimized, and a closed-form solution can be acquired using a least square method.

(3.1.3) When a third sub-problem solved by the BCD method is to fix other optimization variables, the new optimization variable introduced and a ripple control variable are jointly optimized, and the corresponding optimization problem is a convex optimization problem, which can be converted into second-order cone programming to be directly solved by an interior point method.

The three sub-problems above are alternately solved, the multiplier (dual) variable and the penalty parameter are updated, and iteration is performed until convergence or a specified number of iterations is met.

A solution thought in the step is explained in detail below based on mathematical representation.

In a first step, the CCCP method is used to convert the nonconvex part (i.e., a lower bound constraint of power $c_i-\delta_i \le |e_i^H f|$) of the constraint of the transmit power of each antenna into the convex constraint. Specifically, $|e_i^H f|^2 = f^H E_i f$ is set, where $E_i = e_i e_i^H$, and $f_0$ is a certain initial point, then:

$$|e_i^H f|^2 = f_0^H E_i f_0 + 2Re(f_0^H E_i(f-f_0)) + (f-f_0)^H E_i(f-f_0) \ge f_0^H E_i f_0 + 2Re(f_0^H E_i(f-f_0)), \forall f, f_0,$$

and a secondary part in the original constraint is replaced by a linear part $f_0^H E_i f_0 + 2Re(f_0^H E_i(f-f_0))$ to acquire the following convex constraint:

$$(c_i - \delta_i)^2 \ge f_0^H E_i f_0 + 2Re(f_0^H E_i(f-f_0)).$$

Similarly, the nonconvex part of the constraint of the ripple in the main lobe (i.e., a lower bound constraint of ripple $1-\varepsilon \le |a_T^H(\phi) f|$) is converted into the following convex constraint:

$$(1-\varepsilon)^2 \le f_0^H L(\phi) f_0 + 2Re(f_0^H L(\phi)(f-f_0)),$$

wherein $L(\phi) = a_T(\phi) a_T^H(\phi)$.

$f_n$ is set to represent a value of a variable f in an nth iteration, and by linearizing the nonconvex constraints $c_i-\delta_i \le |e_i^H f|$ and $1-\varepsilon \le |a_T^H(\phi)f|$ using the CCCP method, a value $f_{n+1}$ of the variable f in an $(n+1)^{th}$ iteration can be taken by solving the following optimization problem:

$$\min_{A,f,d,\varepsilon} \varepsilon + \frac{1}{2\rho}\|f - Ad + \rho u\|^2 \quad (8)$$

$$|e_i^H f| \le c_i + \delta_i, (i \in \mathcal{N})$$

$$(c_i - \delta_i)^2 \le f_n^H E_i f_n + 2Re(f_n^H E_i(f - f_n)), (i \in \mathcal{N})$$

$$\text{s.t. } |a_T^H(\phi)f| \le 1+\varepsilon, (\phi \in \mathcal{D}_M)$$

$$(1-\varepsilon)^2 \le f_n^H L(\phi) f_n + 2Re(f_n^H L(\phi)(f - f_n)), (\phi \in \mathcal{D}_M)$$

$$|a_T^H(\phi)f| \le \varepsilon, (\phi \in \mathcal{D}_S)$$

$$A(m,n) = e^{jx_{m,n}}, (x_{m,n} \in \mathcal{S} \subset \mathcal{R}).$$

It can be seen that the constraints of the optimization problem (8) are separable. Therefore, the block coordinate descent (BCD) method can be used for solution.

In a second step, the BCD method is used to solve the optimization problem (8), and by decomposing the optimization problem (8) into three sub-problems, specific optimization sub-problems are as follows:

a first optimization sub-problem is as follows:

$$\min_A \|f - Ad + \rho u\|^2 \quad (9)$$
$$\text{s.t. } A(m, n) = e^{jx_{m,n}}, (x_{m,n} \in \mathcal{S} \subset \mathcal{R}).$$

The optimization problem (9) is equivalent to the following optimization problem:

$$\min_A tr(A^H AP) - 2\text{Re}\{tr(A^H R)\} \quad (10)$$
$$\text{s.t. } A(m, n) = e^{jx_{m,n}}, (x_{m,n} \in \mathcal{S} \subset \mathcal{R}),$$

wherein a matrix $P = dd^H$ and a matrix $R = (f+\rho u)d^H$.

It shall be noted that constraints of the optimization problem (10) are still separable. Therefore, the block coordinate descent method can still be used. Specifically, an objective function corresponding to an element $A(m, n)$ is recorded as $h(A(m, n))$, then a function $h(A(m, n))$ can be written into a quadratic form, i.e., $$h(A(m, n)) = a|A(m, n)|^2 - 2\text{Re}\{b^*A(m, n)\},$$

the corresponding optimization problem can be written as:

$$\min_{x_{m,n} \in \hat{s}} h(e^{jx_{m,n}}),$$

and considering $|A(m, n)| = |e^{jx_{m,n}}| = 1$, the optimization problem above can be further written as:

$$\max_{x_{m,n} \in \hat{s}} \text{Re}(b^* e^{jx_{m,n}}), \quad (11)$$

wherein $b = A(m, n)P(n, n) - [AP](m, n) + R(m, n)$, and $[AP](m, n)$ represents an $(m, n)^{th}$ element of a matrix $AP$.

The solution of the optimization problem (11) depends on the set $\mathcal{S}$ considered, and two typical cases are mainly considered in the present invention. A first case is that $\mathcal{S}$ is a set of continuous real numbers (or $\mathcal{S} = [0, 2\pi]$), and at the moment, an optimal solution is $x^*_{m,n} = \text{ar } g(b/|b|)$. A second case is that $\mathcal{S}$ is a discrete finite set, and at the moment, only one-dimensional search is required. For convenience, a specific algorithm flow for solving the problem (10) is as follows:

---

An BCD algorithm is used to solve the optimization problem (10)

1 Initialize: k=1 and Q=AP
2 Repeat
    for i = 1, ..., $N_T$, j = 1, ..., $N_F$
        b = A(i,j)P(j,j) − Q(i,j) + R(i,j)
        x = b/|b|
        Q = Q + (x − A(i,j))I(:,i)P(j,:)
        A(i,j) = x
    end
    k ← k + 1
    until a specified termination condition is met
3 Output: an analog radio frequency matrix A

--- a second optimization sub-problem is as follows:

$$\min_d \|f - Ad + \rho u\|^2,$$

the corresponding optimal solution (closed-form solution) is:

$$d^* = (A^H A)^{-1} A^H (f + \rho u). \quad (12)$$

a third optimization sub-problem is as follows:

$$\min_{f,\varepsilon} \varepsilon + \frac{1}{2\rho} \|f - Ad + \rho u\|^2 \quad (13)$$
$$|e_i^H f| \le c_i + \delta_i, (i \in \mathcal{N})$$
$$(c_i - \delta_i)^2 \le f_n^H E_i f_n + 2\text{Re}(f_n^H E_i (f - f_n)), (i \in \mathcal{N})$$
$$\text{s.t. } |a_T^H(\phi) f| \le 1 + \varepsilon, (\phi \in \mathcal{D}_M)$$
$$(1 - \varepsilon)^2 \le f_n^H L(\phi) f_n + 2\text{Re}(f_n^H L(\phi)(f - f_n)), (\phi \in \mathcal{D}_M)$$
$$|a_T^H(\phi) f| \le \varepsilon, (\phi \in \mathcal{D}_S).$$

It shall be noted that the optimization sub-problem above is a standard convex optimization problem, which can be solved by a standard convex optimization method (such as the interior point method). A specific algorithm flow for solving the problem (8) based on the three sub-problems above is as follows:

---

The BCD algorithm is used to solve the optimization problem (8)

1 Input: $A_{k-1}$, $d_{k-1}$ and ($f_{k-1}$, $\varepsilon_{k-1}$)
2 Repeat
    (1) updating of A by solving the sub-problem (10)
    (2) updating of d by solving the sub-problem (12)
    (3) updating of (f, $\varepsilon$) by solving the sub-problem (13)
Until a specified termination condition is met
3 Output: $A_k$, $d_k$ and ($f_k$, $\varepsilon_k$)

---

Third step: a multiplier (dual) variable u and a penalty parameter $\rho$ are updated, wherein a method for updating the multiplier variable u is as follows:

$$u_{k+1} = u_k + (f_k - A_k d_k)/\rho_k, \quad (14)$$

wherein $A_k$ and $d_k$ respectively represent an analog radio frequency matrix and a digital baseband vector of a $k^{th}$ iteration, while $u_k$ and $\rho_k$ respectively represent a multiplier (dual) variable and a penalty parameter of the $k^{th}$ iteration. The penalty parameter is updated according to the following method:

$$\rho_{k+1} = \begin{cases} \beta \rho_k, & \|f_k - A_k d_k\|^2 > \gamma \|f_{k-1} - A_{k-1} d_{k-1}\|^2, \\ \rho_k, & \text{Otherwise} \end{cases} \quad (15)$$

wherein $\beta \in (0,1)$ and $\gamma \in (0,1)$ are real numbers, and a parameter $\beta$ is used to control a growth rate of the penalty parameter $\beta$. A specific algorithm flow for solving the optimization problem (4) using the BCD method is as follows:

| Penalty decomposition and the BCD method are used to solve the optimization problem (4) |
|---|
| 1 Initialize $A_0$, $d_0$, $(f_0, \varepsilon_0)$, $\rho_1$ and $v_1$, and k=1 is set
2 Repeat
  (1) updating of original variables: A, d and (f, $\varepsilon$)
  (2) updating of the penalty parameter $\rho$
    if $\|f_k - A_k d_k\|^2 > \gamma \|f_{k-1} - A_{k-1} d_{k-1}\|^2$
      $\rho_{k+1} = \beta \rho_k$
    else
      $\rho_{k+1} = \rho_k$.
    end
  (3) updating of the multiplier variable v
    $v_{k+1} = v_k + (f_k - A_k d_k)/\rho_k$.
  (4) k ← k + 1. k←k+1.
Until a specified termination condition is met
3 Output: an analog radio frequency matrix A* and a digital baseband vector d*. |

The method for forming a power-efficient digital-analog hybrid beam provided by the embodiment of the present invention can effectively reduce a peak-to-average ratio since the normalized transmit power of each antenna is constrained in a very small range and the difference of normalized transmit powers of different antennas is very small. It shall be pointed out that it is a very strong constraint that limits the normalized transmit power of the antenna in a very small range. However, even so, the designed beam still has very good beam performance, i.e., very small ripples in the main lobe and the side lobe, very narrow transition band, etc. Moreover, due to explicit consideration and optimization of the constraint on the phase value of the phase shifter, even when a resolution (i.e., a quantization bit number) of the phase shifter is relatively low, a beam with very good performance can be designed.

It shall be pointed out that the method for forming a hybrid beam disclosed by the present invention can be applied not only to a communication system and a radar system, but also to other wireless systems based on an antenna array; and the method can be applied not only to a uniform linear array, but also to other antenna arrays such as a planar array. In order to facilitate the understanding of the solution and effect of the present invention, the present invention provides another exemplary embodiment, a multi-antenna system in which a transmitting end is a uniform linear array is considered in the embodiment, a number of antennas of the array is N=64, a number of radio frequency chains is K=3, and a distance between two adjacent antennas is d=3λ/8, wherein λ is a signal wavelength. For simplicity, it is assumed that only a single antenna is installed at a receiving end. It shall be noted that although only the transmitting end provided with the antenna array is considered in the embodiment, when the receiving end is provided with the antenna array, the present invention can also be used.

Because of being a one-dimensional linear array, a beam space is an interval [−1,1] (a maximum space that can be considered), and beam design input parameters are that: (1) the main lobe is set as $\mathcal{I}_M = [-1, -33/64]$, the side lobe is set as $\mathcal{I}_S = [-31/64, 1]$, and the transition band is set as $\mathcal{I}_r = [-33/64, -31/64]$; (2) the sampling accuracies in the main lobe and the side lobe are set as $1/128$; (3) the normalized transmit power of each antenna is set as 1, i.e., $c_1$ i.e., $c_1 = \ldots = c_N = 1$: (4) Robustness control parameters are all set as 0.05, i.e., $\delta_1 = \ldots = \delta_N = 0.05$; and (5) each phase shifter uses 4 bits for quantization, so that a set of values of each phase shifter that can be taken is $$\delta = \left\{0, \frac{2\pi}{16}, \frac{2 \times 2\pi}{16}, \frac{3 \times 2\pi}{16}, \ldots, \frac{14 \times 2\pi}{16}, \frac{15 \times 2\pi}{16}\right\}.$$

The method for forming a power-efficient digital-analog hybrid beam in a multi-antenna system provided by the embodiment comprises the following steps.

In step (1), mathematical modeling is performed on a hybrid beam forming design to acquire a corresponding optimization problem. In order to minimize ripples in a main lobe and a side lobe of a designed beam, a designed hybrid beam Ad can be modeled as the following optimization problem:

$$\min_{A,d,\varepsilon} \varepsilon \quad (1)$$

$$|e_i^H A d| = 1, (i \in \mathcal{N})$$

$$\text{s.t.} \quad 1 - \varepsilon \leq |a_T^H(\phi) A d| \leq 1 + \varepsilon, (\phi \in \mathcal{I}_M)$$

$$|a_T^H(\phi) A d| \leq \varepsilon, (\phi \in \mathcal{I}_S)$$

$$A(m, n) = e^{jx_{m,n}}, (x_{m,n} \in \delta),$$

wherein $e_i = (0_{i-1}, 1, 0_{64-i})$ represents a unit vector in Euclidean space (i.e., an $i^{th}$ element is 1, and other elements are 0), and a set $\mathcal{N} = \{1, 2, \ldots, 64\}$.

In order to improve a robustness of the designed beam, the normalized transmit power is relaxed to a small interval [0.95, 1.05] according to given robustness control parameters $\delta_1, \ldots, \delta_N$, and the corresponding optimization problem can be written as:

$$\min_{A,d,\varepsilon} \varepsilon \quad (2)$$

$$0.95 \leq |e_i^H A d| \leq 1.05, (i \in \mathcal{N})$$

$$\text{s.t.} \quad 1 - \varepsilon \leq |a_T^H(\phi) A d| \leq 1 + \varepsilon, (\phi \in \mathcal{I}_M)$$

$$|a_T^H(\phi) A d| \leq \varepsilon, (\phi \in \mathcal{I}_S)$$

$$A(m, n) = e^{jx_{m,n}}, (x_{m,n} \in \delta).$$

Since $\mathcal{I}_M$ and $\mathcal{I}_S$ are continuous or uncountable, the $\mathcal{I}_M$ and the $\mathcal{I}_S$ shall be discretized or sampled, a sampling interval is set as $1/128$, and $\mathcal{I}_M$ and $\mathcal{I}_S$ are respectively discretized into:

$$\mathcal{D}_M = \left\{-1, -1 + \frac{1}{128}, -1 + \frac{2}{128}, \ldots, -\frac{67}{128}, -\frac{66}{128}\right\}$$

and $$\mathcal{D}_S = \left\{-\frac{62}{128}, -\frac{61}{128}, \ldots, \frac{127}{128}, \frac{128}{128}\right\},$$

and the corresponding optimization problem can be rewritten as:

$$\min_{A,d,\varepsilon} \varepsilon \quad (3)$$

$$0.95 \leq |e_i^H A d| \leq 1.05, (i \in \mathcal{N})$$

-continued s.t. $1-\varepsilon \le |a_T^H(\phi)Ad| \le 1+\varepsilon, (\phi \in \mathcal{J}_M)$ $|a_T^H(\phi)Ad| \le \varepsilon, (\phi \in \mathcal{J}_S)$ $A(m, n) = e^{jx_{m,n}}, (x_{m,n} \in \mathcal{S})$.

In Step (2), coupling formed by multiplication of an analog part and a digital part is processed by introducing a new optimization variable and a corresponding equality constraint, a penalty function method is further used to process the equality constraint. Specifically, the step (2) is divided into three steps:

In a first step, the coupling of the analog part and the digital part in the product form is processed, a new optimization variable f is introduced for this purpose, and f=Ad is set to acquire the following new optimization problem:

$$\min_{A,f,d,\varepsilon} \varepsilon \qquad (4)$$

$0.95 \le |e_i^H f| \le 1.05, (i \in \mathcal{N})$ $1-\varepsilon \le |a_T^H(\phi)f| \le 1+\varepsilon, (\phi \in \mathcal{D}_M)$ s.t. $|a_T^H(\phi)f| \le \varepsilon, (\phi \in \mathcal{D}_S)$ $f = Ad$ $A(m, n) = e^{jx_{m,n}}, (x_{m,n} \in \mathcal{S})$.

It shall be pointed out that the optimization problem (4) is equivalent to the original optimization problem (3).

In a second step, in order to process the new equality constraint f=Ad introduced, the quadratic penalty function method is used to transfer the new equality constraint to the objective function to acquire the following optimization problem:

$$\min_{A,f,d,\varepsilon} \varepsilon + \frac{1}{2\rho}\|f - Ad\|^2 \qquad (5)$$

$0.95 \le |e_i^H f| \le 1.05, (i \in \mathcal{N})$ s.t. $1-\varepsilon \le |a_T^H(\phi)f| \le 1+\varepsilon, (\phi \in \mathcal{D}_M)$ $|a_T^H(\phi)f| \le \varepsilon, (\phi \in \mathcal{D}_S)$ $A(m, n) = e^{jx_{m,n}}, (x_{m,n} \in \mathcal{S})$.

In a third step, in order to process the ill-conditioning caused by a very small penalty parameter $\rho$, a multiplier (dual) variable u is introduced for the equality constraint f=Ad to acquire the following augmented Lagrange penalty function problem:

$$\min_{A,f,d,\varepsilon} \varepsilon + \frac{1}{2\rho}\|f - Ad\|^2 + \operatorname{Re}(u^H(f - Ad)) \qquad (6)$$

$0.95 \le |e_i^H f| \le 1.05, (i \in \mathcal{N})$ s.t. $1-\varepsilon \le |a_T^H(\phi)f| \le 1+\varepsilon, (\phi \in \mathcal{D}_M)$ $|a_T^H(\phi)f| \le \varepsilon, (\phi \in \mathcal{D}_S)$ $A(m, n) = e^{jx_{m,n}}, (x_{m,n} \in \mathcal{S})$.

Through calculation, the optimization problem (6) is equivalent to the following optimization problem:

$$\min_{A,f,d,\varepsilon} \varepsilon + \frac{1}{2\rho}\|f - Ad + \rho u\|^2 \qquad (7)$$

$0.95 \le |e_i^H f| \le 1.05, (i \in \mathcal{N})$ s.t. $1-\varepsilon \le |a_T^H(\phi)f| \le 1+\varepsilon, (\phi \in \mathcal{D}_M)$ $|a_T^H(\phi)f| \le \varepsilon, (\phi \in \mathcal{D}_S)$ $A(m, n) = e^{jx_{m,n}}, (x_{m,n} \in \mathcal{S})$.

In step (3), a CCCP method is used to convert nonconvex parts (i.e., lower bounds of the power constraint) of the constraint of the transmit power of each antenna into convex constraints. Similarly, nonconvex parts of the constraint of the ripple in the main lobe (i.e., lower bounds of the ripple constraint) are converted into convex constraints. A BCD method is further used to solve the optimization problem after conversion. Specifically, the step (3) is divided into two steps:

In a first step, the CCCP method is used to convert the nonconvex part (i.e., a lower bound constraint of power $0.95 \le |e_i^H f|$) of the constraint of the transmit power of each antenna into the convex constraint. $E_i = e_i e_i^H$ is set, then $|e_i^H f|^2 = f^H E_i f$, and $f_0$ is set as an initial point of a certain selection, $f_n$ represents a value of a variable f in an $n^{th}$ iteration, and when $n \ge 0$, $|e_i^H f|^2 = f_0^H E_i f_n + 2\operatorname{Re}(f_n^H E_i(f-f_n)) + (f-f_n)^H E_i(f-f_n) \ge$
$f_n^H E_i f_n + 2\operatorname{Re}(f_n^H E_i(f-f_n)), \forall f, f_n$.

A secondary part in the original constraint is replaced by a linear part $f_n^H E_i f_n + 2\operatorname{Re}(f_n^H E_i(f-f_n))$ to acquire the following convex constraint:

$0.95^2 \ge f_n^H E_i f_n + 2\operatorname{Re}(f_n^H E_i(f-f_n))$.

$L(\phi) = a_T(\phi)a_T^H(\phi)$ is set, and similarly, the nonconvex part of the constraint of the ripple in the main lobe (i.e., a lower bound constraint of ripple $1-\varepsilon \ge |a_T^H(\phi)f|$) is converted into the following convex constraint:

$(1-\varepsilon)^2 \ge f_n^H L(\phi)f_n + 2\operatorname{Re}(f_n^H L(\phi)(f-f_n))$.

When $f_n$ is known, $f_{n+1}$ can be acquired by solving the following optimization problem:

$$\min_{A,f,d,\varepsilon} \varepsilon + \frac{1}{2\rho}\|f - Ad + \rho u\|^2 \qquad (8)$$

$|e_i^H f| \le 1.05, (i \in \mathcal{N})$ $0.95^2 \le f_n^H E_i f_n + 2\operatorname{Re}(f_n^H E_i(f - f_n)), (i \in \mathcal{N})$ s.t. $|a_T^H(\phi)f| \le 1+\varepsilon, (\phi \in \mathcal{D}_M)$ $(1-\varepsilon)^2 \le f_n^H L(\phi)f_n + 2\operatorname{Re}(f_n^H L(\phi)(f - f_n)), (\phi \in \mathcal{D}_M)$ $|a_T^H(\phi)f| \le \varepsilon, (\phi \in \mathcal{D}_S)$ $A(m, n) = e^{jx_{m,n}}, (x_{m,n} \in \mathcal{S})$.

It can be seen that the constraints of the optimization problem (8) are separable. Therefore, the block coordinate descent (BCD) method can be used for solution.

In a second step, the BCD method is used to solve the optimization problem (8), and the optimization problem (8) is decomposed into three sub-problems to be solved alternately and iteratively. A first optimization sub-problem is as follows:

$$\min_{A} \|f - Ad + \rho u\|^2 \quad (9)$$

$$\text{s.t. } A(m, n) = e^{j x_{m,n}}, (x_{m,n} \in \mathcal{S}).$$

$P = dd^H$ and $R = (f+\rho u)d^H$ are set, and the optimization problem (9) can be equivalently written as:

$$\min_{A} {}_{tr}(A^H AP) - 2\, Re\{tr(A^H R)\} \quad (10)$$

$$\text{s.t. } A(m, n) = e^{j x_{m,n}}, (x_{m,n} \in \mathcal{S}).$$

It shall be noted that constraints of the optimization problem (10) are still separable. Therefore, the block coordinate descent method can still be used. Specifically, an objective function corresponding to an element A(m, n) is recorded as h(A(m, n)), then h(A(m, n)) can be written into the following quadratic form, i.e., $$h(A(m, n)) = a|A(m,n)|^2 - 2\, Re\{b^* A(m, n)\},$$

the corresponding optimization problem can be written as:

$$\min_{x_{m,n} \in S} h(e^{j x_{m,n}}).$$

and considering $|A(m, n)| = |e^{j x_{m,n}}| = 1$, the optimization problem above can be further written as:

$$\max_{x_{m,n} \in S} Re(b * e^{j x_{mn}}), \quad (11)$$

wherein $b = A(m, n)P(n, n) - [AP](m, n) + R(m, n)$, $[AP](m,n)$ represents an $(m, n)^{th}$ element of a matrix $AP$, and only one-dimensional search is required to solve the optimization problem (11).

For each $m \in \{1, 2, \ldots, 64\}$ and $n \in \{1, 2, 3\}$, the optimization problem (11) is constructed and solved using the one-dimensional search, and alternative iterations are performed until convergence. Different convergence conditions can be used, and the convergence condition here is that a change of a function value of an objective function $_{tr}(A^H AP) - 2Re\{_{tr}(A^H R)\}$ is less than $10^{-4}$.

A second optimization sub-problem is as follows:

$$\min_{d} \|f - Ad + \rho u\|^2, \quad (12)$$

the corresponding optimal solution (closed-form solution) is:

$$d^* = (A^H A)^{-1} A^H (f + \rho u).$$

A third optimization sub-problem is as follows:

$$\min_{f, \varepsilon} \varepsilon + \frac{1}{2\rho} \|f - Ad + \rho u\|^2 \quad (13)$$

$$|e_i^H f| \le 1.05, (i \in \mathcal{N})$$

$$0.95^2 \le f_n^H E_i f_n + 2Re(f_n^H E_i(f - f_n)), (i \in \mathcal{N})$$

$$\text{s.t. } |a_T^H(\phi) f| \le 1 + \varepsilon, (\phi \in \mathcal{D}_M)$$

-continued $$(1 - \varepsilon)^2 \le f_n^H L(\phi) f_n + 2\, Re(f_n^H L(\phi)(f - f_n)), (\phi \in \mathcal{D}_M)$$

$$|a_T^H(\phi) f| \le \varepsilon, (\phi \in \mathcal{D}_S).$$

The optimization problem (13) is a standard convex optimization problem, which can be solved by a standard convex optimization method (such as the interior point method). The solution of the optimization problem (8) can be obtained by alternately solving the optimization sub-problems (10), (12) and (13) until convergence.

In a third step, a multiplier (dual) variable u and a penalty parameter ρ are updated, wherein a method for updating the multiplier variable u is as follows:

$$u_{k+1} = u_k + (f_k - A_k d_k)/\rho_k, \quad (14)$$

wherein $A_k$ and $d_k$ respectively represent an analog radio frequency matrix and a digital baseband vector of a $k^{th}$ iteration, while $u_k$ and $\rho_k$ respectively represent a multiplier (dual) variable and a penalty parameter of the $k^{th}$ iteration. The penalty parameter is updated according to the following method:

$$\rho_{k+1} = \begin{cases} \beta \rho_k, & \|f_k - A_k d_k\|^2 > \gamma \|f_{k-1} - A_{k-1} d_{k-1}\|^2 \\ \rho_k, & \text{otherwise} \end{cases}, \quad (15)$$

wherein β=0.95 and γ=0.95, the penalty parameter β has an initial value $\beta_0 = 15$, and the multiplier (dual) variable u has an initial value $u_0 = [1, 1, \ldots, 1]^T$. In order to solve the optimization problem (8), only the iteration/updating needs to be performed according to the three steps above until convergence, the convergence condition is $\|f_k - A_k d_k\| \le 0.2$, and A and d acquired after convergence (respectively recorded as A* and d*) are an analog component and a digital component of the designed hybrid beam.

Figure 4:
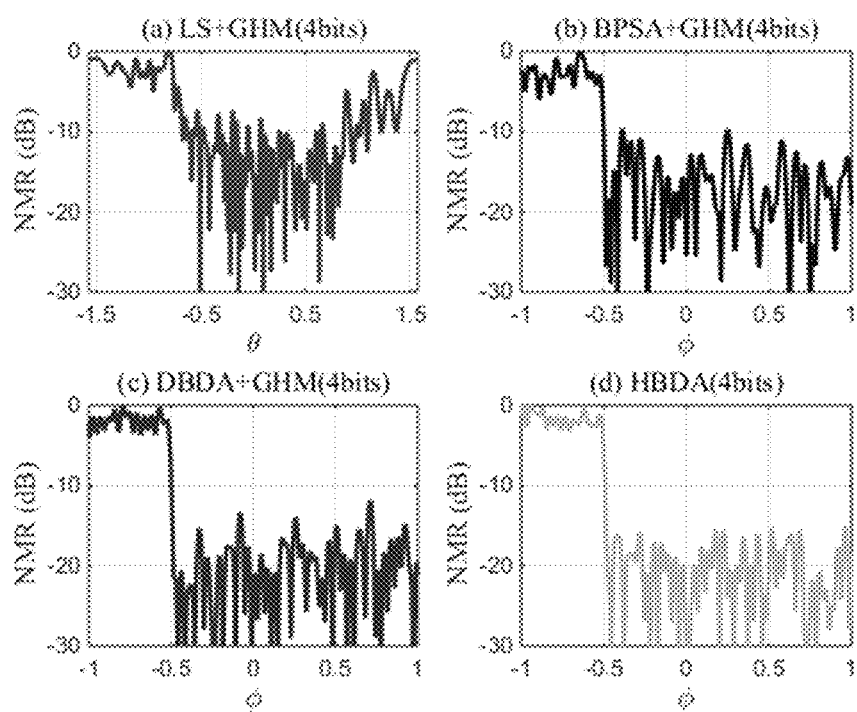
FIG. 4 is a comparison diagram of normalized magnitude responses of the beam designed in the embodiment of the present invention and a beam designed by other methods.
Figure 5:
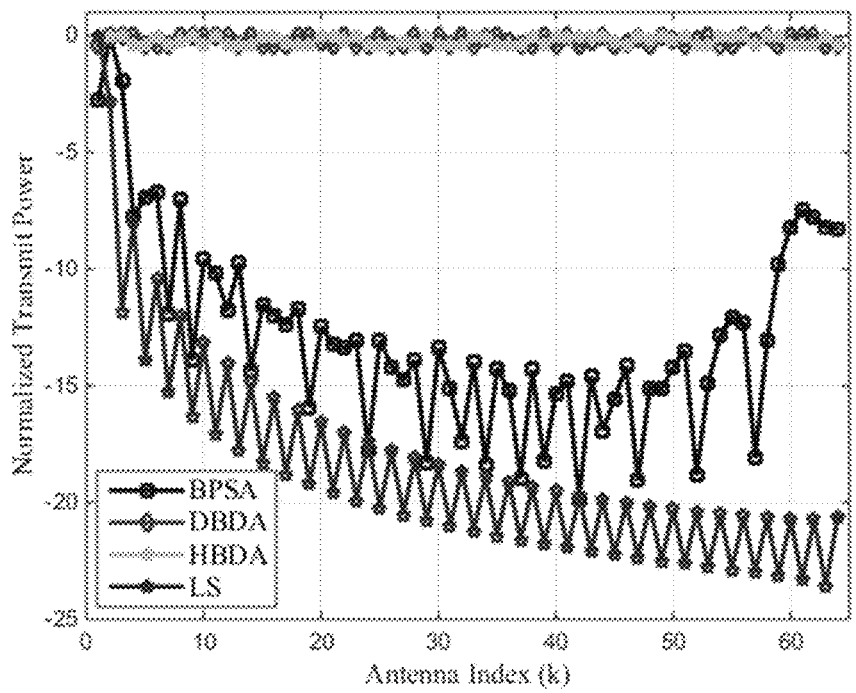
FIG. 5 is a comparison diagram of normalized powers of antennas corresponding to the beam designed in the embodiment of the present invention and the beam designed by other methods.

A normalized magnitude response of a beam $f_{opt} = A^* d^*$ designed in the embodiment is as shown in FIG. 3, and it shall be pointed out that since the phase value of the phase shifter is taken into account when the beam is designed by the present invention, the quantization of the phase value does not need to be considered. In order to show the advantages of the method disclosed by the present invention (referred to as HBDA, i.e., Hybrid Beam Design Algorithm), a normalized magnitude response of a beam designed by other methods (comprising a Least Square—LS, a Beam Pattern Shaping Algorithm—BPSA and a Digital Beam Design Algorithm—DBDA, and the phase values of the phase shifters of the beams designed by the three methods are all taken by a geometry hybrid mapping method, namely GHM) is as shown in FIG. 4. A normalized transmit power is defined as 10 log (|f(i)|/max{|f(i)|}), which can be used to reflect the difference of the transmit powers of the power amplifiers corresponding to the antennas, and the normalized transmit powers corresponding to the beams designed by the four methods are as shown in FIG. 5. It can be seen that the method for designing a hybrid beam provided by the present invention not only has the best beam performance (i.e., the ripples in the main lobe and the side lobe are minimum, and the transition band is very narrow), but also has very little difference of the transmit powers of the antennas. Therefore, the PAPR is very low, and the power efficiency of the power amplifier is very high. Since the same constraint is imposed by the DBDA on the transmit power of each antenna as the HBDA when designing the beam, the normalized transmit power is the same as that in the HBDA.

However, since the phase constraint of the phase shifter is not taken into account when the beam is designed by the DBDA, the beam performance of the designed beam is worse than that of the HBDA, i.e., the ripples in the main lobe and the side lobe are larger than those of the HBDA.

Figure 6:
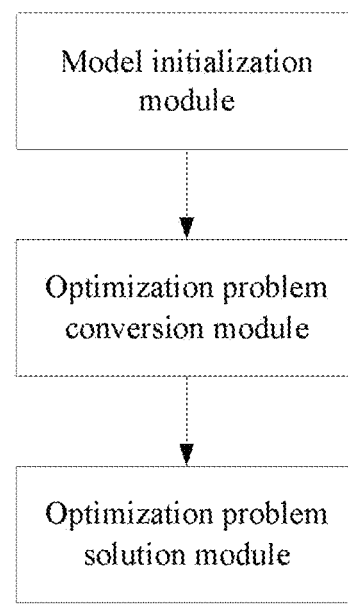
FIG. 6 is a structure diagram of an apparatus for forming a power-efficient digital-analog hybrid beam according to an embodiment of the present invention.

As shown in FIG. 6, an apparatus for forming a power-efficient digital-analog hybrid beam in a multi-antenna system disclosed by the embodiment of the present invention comprises a model initialization module, an optimization problem conversion module and an optimization problem solution module. The model initialization module is configured to perform mathematical modeling on a hybrid beam forming design to acquire a corresponding optimization problem, the optimization problem comprising three groups of constraint conditions, wherein a first group of constraint conditions is that a value of a transmit power of each antenna is taken in a specified range, a second group of constraint conditions is that values of ripples in a main lobe and a side lobe are taken in a specified range, and a third group of constraint conditions is that a phase value of each phase shifter is taken in a specified set, and an optimization object is to minimize the ripples in the main lobe and the side lobe, and acquire a corresponding analog radio frequency matrix and a digital baseband vector of the hybrid beam forming by solving the optimization problem; the optimization problem conversion module is configured to replace a product of the analog radio frequency matrix and the digital baseband vector in the constraint conditions of the optimization problem by a new optimization variable, transfer a corresponding equality constraint to an objective function using a penalty function method, introduce a multiplier variable for the equality constraint, and convert an original optimization problem into an augmented Lagrange penalty function problem; and the optimization problem solution module is configured to use a CCCP method to convert nonconvex constraints of lower bounds of the constraint of the transmit power of each antenna and the constraint of the ripple in the main lobe in the optimization problem acquired by the optimization problem conversion module into convex constraints, and use a BCD method to solve the optimization problem after constraint conversion.

The optimization problem solution module comprises: a first solution unit configured to fix other optimization variables, construct and solve a first sub-problem taking the analog radio frequency matrix as the optimization variable; a second solution unit configured to construct and solve a second sub-problem taking the digital baseband vector as the optimization variable; a third solution unit configured to construct and solve a third sub-problem taking the new optimization variable introduced and a ripple control variable as the optimization variables; and an iteration control unit configured to sequentially call the three solution units above to solve and update the multiplier variable and a penalty parameter in each iteration until the iteration is converged or a specified number of iterations is met.

The embodiment of the apparatus for forming a power-efficient digital-to-analog hybrid beam in a multi-antenna system above is used to implement the embodiment of the method for forming a power-efficient digital-to-analog hybrid beam in a multi-antenna system above, specific details refer to the embodiment of the method for forming a power-efficient digital-to-analog hybrid beam in a multi-antenna system above, which will not be repeated here.

Those skilled in the art can understand that the apparatus for forming a power-efficient digital-to-analog hybrid beam in a multi-antenna system above further comprises some other commonly known structures, such as a processor, a memory, etc., wherein the memory comprises but is not limited to a random memory, a flash memory, a read-only memory, a register, etc., and the processor comprises but is not limited to CPLD, FPGA, DSP, ARM, MIPS and other processors.

Those skilled in the art can understand that the apparatus for forming a power-efficient digital-to-analog hybrid beam in a multi-antenna system above further comprises some other commonly known structures, such as a processor, a memory, etc., wherein the memory comprises but is not limited to a random memory, a flash memory, a read-only memory, a register, etc., and the processor comprises but is not limited to a CPLD, a FPGA, a DSP, an ARM, a MIPS and other processors.

Based on the same technical concept as the method embodiment, the embodiments of the present invention further provide a computer device, and the computer device can comprise a memory, a processor and a computer program stored on the memory and executable on the processor. When the computer program is loaded on the processor, the steps in the embodiment of the method for forming a power-efficient digital-analog hybrid beam in a multi-antenna system above are implemented.

What is claimed is:

1. A method for forming a power-efficient digital-analog hybrid beam in a multi-antenna system, comprising:
   (1) performing mathematical modeling on a hybrid beam forming design to acquire a corresponding optimization problem, the optimization problem comprising three groups of constraint conditions, wherein a first group of constraint conditions is that a value of a transmit power of each antenna is taken in a specified range, a second group of constraint conditions is that values of ripples in a main lobe and a side lobe are taken in a specified range, and a third group of constraint conditions is that a phase value of each phase shifter is taken in a specified set, and an optimization object is to minimize the ripples in the main lobe and the side lobe, and acquire a corresponding analog radio frequency matrix and a digital baseband vector of the hybrid beam forming by solving the optimization problem;
   (2) replacing a product of the analog radio frequency matrix and the digital baseband vector in the constraint conditions of the optimization problem by a new optimization variable, transferring a corresponding equality constraint to an objective function using a penalty function method, introducing a multiplier variable for the equality constraint, and converting an original optimization problem into an augmented Lagrange penalty function problem; and
   (3) using a constrained concave-convex procedure (CCCP) method to convert nonconvex constraints of lower bounds of the constraint of the transmit power of each antenna and the constraint of the ripple in the main lobe in the optimization problem acquired in step (2) into convex constraints, and using a block coordinate descent (BCD) method to solve the optimization problem after conversion.

2. The method for forming a power-efficient digital-analog hybrid beam in the multi-antenna system according to claim 1, wherein the using the BCD method to solve the optimization problem converted in the step (3) comprises: fixing other optimization variables, constructing and solving a first sub-problem taking the analog radio frequency matrix as the optimization variable; fixing other optimization variables, constructing and solving a second sub-problem taking the digital baseband vector as the optimization variable;

fixing other optimization variables, constructing and solving a third sub-problem taking the new optimization variable introduced and a ripple control variable as the optimization variables; and alternately solving the three sub-problems above, updating the multiplier variable and a penalty parameter, and performing iteration until convergence or a specified number of iterations is met.

3. The method for forming the power-efficient digital-analog hybrid beam in the multi-antenna system according to claim 1, wherein the objective function of the optimization problem acquired in the step (2) is:

$$\min_{A,f,d,\varepsilon} \varepsilon + \frac{1}{2\rho}\|f - Ad + \rho u\|^2$$

wherein $\varepsilon$ is a ripple control variable, f is the new optimization variable introduced, A and d are respectively the analog radio frequency matrix and the digital baseband vector, $\rho$ is a penalty parameter, and u is the multiplier variable introduced.

4. The method for forming the power-efficient digital-analog hybrid beam in the multi-antenna system according to claim 2, wherein a constraint condition of the first sub-problem constructed in the step (3) is that a phase value of each phase shifter is taken in a specified set, and an objective function is:

$$\min_{A} \|f - Ad + \rho u\|^2$$

wherein f is the new optimization variable introduced previously, A and d are respectively the analog radio frequency matrix and the digital baseband vector, and u is the multiplier variable introduced.

5. The method for forming the power-efficient digital-analog hybrid beam in the multi-antenna system according to claim 2, wherein the second sub-problem constructed in the step (3) is:

$$\min_{d} \|f - Ad + \rho u\|^2$$

wherein f is the new optimization variable introduced previously, A and d are respectively the analog radio frequency matrix and the digital baseband vector, and u is the multiplier variable introduced.

6. The method for forming the power-efficient digital-analog hybrid beam in the multi-antenna system according to claim 2, wherein constraint conditions of the third sub-problem constructed in the step (3) are a power constraint and a ripple constraint after constraint conversion, and an objective function is:

$$\min_{f,\varepsilon} \varepsilon + \frac{1}{2\rho}\|f - Ad + \rho u\|^2$$

wherein $\varepsilon$ is the ripple control variable, f is the new optimization variable introduced, A and d are respectively the analog radio frequency matrix and the digital baseband vector, $\rho$ is the penalty parameter, and u is the multiplier variable introduced.

7. An apparatus for forming a power-efficient digital-analog hybrid beam in a multi-antenna system for implementing the method for forming the power-efficient digital-analog hybrid beam in the multi-antenna system according to claim 1, comprising:
a model initialization module configured to perform mathematical modeling on a hybrid beam forming design to acquire a corresponding optimization problem, the optimization problem comprising three groups of constraint conditions, wherein a first group of constraint conditions is that a value of a transmit power of each antenna is taken in a specified range, a second group of constraint conditions is that values of ripples in a main lobe and a side lobe are taken in a specified range, and a third group of constraint conditions is that a phase value of each phase shifter is taken in a specified set, and an optimization object is to minimize the ripples in the main lobe and the side lobe, and acquire a corresponding analog radio frequency matrix and a digital baseband vector of the hybrid beam forming by solving the optimization problem;
an optimization problem conversion module configured to replace a product of the analog radio frequency matrix and the digital baseband vector in the constraint conditions of the optimization problem by a new optimization variable, transfer a corresponding equality constraint to an objective function using a penalty function method, introduce a multiplier variable for the equality constraint, and convert an original optimization problem into an augmented Lagrange penalty function problem; and
an optimization problem solution module configured to use a constrained concave-convex procedure (CCCP) method to convert nonconvex constraints of lower bounds of the constraint of the transmit power of each antenna and the constraint of the ripple in the main lobe in the optimization problem acquired by the optimization problem conversion module into convex constraints, and use a block coordinate descent (BCD) method to solve the optimization problem after constraint conversion.

8. The power-efficient digital-analog hybrid beam forming apparatus in the multi-antenna system according to claim 7, wherein the optimization problem solution module comprises:
a first solution unit configured to fix other optimization variables, construct and solve a first sub-problem taking the analog radio frequency matrix as the optimization variable;
a second solution unit configured to construct and solve a second sub-problem taking the digital baseband vector as the optimization variable;
a third solution unit configured to construct and solve a third sub-problem taking the new optimization variable introduced and a ripple control variable as the optimization variables; and
an iteration control unit configured to sequentially call the three solution units above to solve and update the multiplier variable and a penalty parameter in each iteration until the iteration is converged or a specified number of iterations is met.

9. A computer device, comprising a memory, a processor and a computer program stored on the memory and executable on the processor, wherein when the computer program is loaded on the processor, the method for forming the power-efficient digital-analog hybrid beam in the multi-antenna system according to claim 1 is implemented.

10. An apparatus for forming a power-efficient digital-analog hybrid beam in a multi-antenna system for implementing the method for forming a power-efficient digital-analog hybrid beam in the multi-antenna system according to claim 2, comprising:
   a model initialization module configured to perform mathematical modeling on a hybrid beam forming design to acquire a corresponding optimization problem, the optimization problem comprising three groups of constraint conditions, wherein a first group of constraint conditions is that a value of a transmit power of each antenna is taken in a specified range, a second group of constraint conditions is that values of ripples in a main lobe and a side lobe are taken in a specified range, and a third group of constraint conditions is that a phase value of each phase shifter is taken in a specified set, and an optimization object is to minimize the ripples in the main lobe and the side lobe, and acquire a corresponding analog radio frequency matrix and a digital baseband vector of the hybrid beam forming by solving the optimization problem;
   an optimization problem conversion module configured to replace a product of the analog radio frequency matrix and the digital baseband vector in the constraint conditions of the optimization problem by a new optimization variable, transfer a corresponding equality constraint to an objective function using a penalty function method, introduce a multiplier variable for the equality constraint, and convert an original optimization problem into an augmented Lagrange penalty function problem; and
   an optimization problem solution module configured to use a constrained concave-convex procedure (CCCP) method to convert nonconvex constraints of lower bounds of the constraint of the transmit power of each antenna and the constraint of the ripple in the main lobe in the optimization problem acquired by the optimization problem conversion module into convex constraints, and use a block coordinate descent (BCD) method to solve the optimization problem after constraint conversion.

11. The power-efficient digital-analog hybrid beam forming apparatus in the multi-antenna system according to claim 10, wherein the optimization problem solution module comprises:
   a first solution unit configured to fix other optimization variables, construct and solve a first sub-problem taking the analog radio frequency matrix as the optimization variable;
   a second solution unit configured to construct and solve a second sub-problem taking the digital baseband vector as the optimization variable;
   a third solution unit configured to construct and solve a third sub-problem taking the new optimization variable introduced and a ripple control variable as the optimization variables; and
   an iteration control unit configured to sequentially call the three solution units above to solve and update the multiplier variable and a penalty parameter in each iteration until the iteration is converged or a specified number of iterations is met.

12. An apparatus for forming a power-efficient digital-analog hybrid beam in a multi-antenna system for implementing the method for forming the power-efficient digital-analog hybrid beam in the multi-antenna system according to claim 3, comprising:
   a model initialization module configured to perform mathematical modeling on a hybrid beam forming design to acquire a corresponding optimization problem, the optimization problem comprising three groups of constraint conditions, wherein a first group of constraint conditions is that a value of a transmit power of each antenna is taken in a specified range, a second group of constraint conditions is that values of ripples in a main lobe and a side lobe are taken in a specified range, and a third group of constraint conditions is that a phase value of each phase shifter is taken in a specified set, and an optimization object is to minimize the ripples in the main lobe and the side lobe, and acquire a corresponding analog radio frequency matrix and a digital baseband vector of the hybrid beam forming by solving the optimization problem;
   an optimization problem conversion module configured to replace a product of the analog radio frequency matrix and the digital baseband vector in the constraint conditions of the optimization problem by a new optimization variable, transfer a corresponding equality constraint to an objective function using a penalty function method, introduce a multiplier variable for the equality constraint, and convert an original optimization problem into an augmented Lagrange penalty function problem; and
   an optimization problem solution module configured to use a constrained concave-convex procedure (CCCP) method to convert nonconvex constraints of lower bounds of the constraint of the transmit power of each antenna and the constraint of the ripple in the main lobe in the optimization problem acquired by the optimization problem conversion module into convex constraints, and use a block coordinate descent (BCD) method to solve the optimization problem after constraint conversion.

13. The power-efficient digital-analog hybrid beam forming apparatus in the multi-antenna system according to claim 12, wherein the optimization problem solution module comprises:
   a first solution unit configured to fix other optimization variables, construct and solve a first sub-problem taking the analog radio frequency matrix as the optimization variable;
   a second solution unit configured to construct and solve a second sub-problem taking the digital baseband vector as the optimization variable;
   a third solution unit configured to construct and solve a third sub-problem taking the new optimization variable introduced and a ripple control variable as the optimization variables; and
   an iteration control unit configured to sequentially call the three solution units above to solve and update the multiplier variable and a penalty parameter in each iteration until the iteration is converged or a specified number of iterations is met.

14. An apparatus for forming a power-efficient digital-analog hybrid beam in a multi-antenna system for implementing the method for forming the power-efficient digital-analog hybrid beam in the multi-antenna system according to claim 4, comprising:
   a model initialization module configured to perform mathematical modeling on a hybrid beam forming design to acquire a corresponding optimization problem, the optimization problem comprising three groups of constraint conditions, wherein a first group of constraint conditions is that a value of a transmit power of each antenna is taken in a specified range, a second group of constraint conditions is that values of ripples in a main lobe and a side lobe are taken in a specified range, and a third group of constraint conditions is that a phase value of each phase shifter is taken in a specified set, and an optimization object is to minimize the ripples in the main lobe and the side lobe, and acquire a corresponding analog radio frequency matrix and a digital baseband vector of the hybrid beam forming by solving the optimization problem;

an optimization problem conversion module configured to replace a product of the analog radio frequency matrix and the digital baseband vector in the constraint conditions of the optimization problem by a new optimization variable, transfer a corresponding equality constraint to an objective function using a penalty function method, introduce a multiplier variable for the equality constraint, and convert an original optimization problem into an augmented Lagrange penalty function problem; and an optimization problem solution module configured to use a constrained concave-convex procedure (CCCP) method to convert nonconvex constraints of lower bounds of the constraint of the transmit power of each antenna and the constraint of the ripple in the main lobe in the optimization problem acquired by the optimization problem conversion module into convex constraints, and use a block coordinate descent (BCD) method to solve the optimization problem after constraint conversion.

15. The power-efficient digital-analog hybrid beam forming apparatus in the multi-antenna system according to claim 14, wherein the optimization problem solution module comprises:
a first solution unit configured to fix other optimization variables, construct and solve a first sub-problem taking the analog radio frequency matrix as the optimization variable;
a second solution unit configured to construct and solve a second sub-problem taking the digital baseband vector as the optimization variable;
a third solution unit configured to construct and solve a third sub-problem taking the new optimization variable introduced and a ripple control variable as the optimization variables; and
an iteration control unit configured to sequentially call the three solution units above to solve and update the multiplier variable and a penalty parameter in each iteration until the iteration is converged or a specified number of iterations is met.

16. An apparatus for forming a power-efficient digital-analog hybrid beam in a multi-antenna system for implementing the method for forming the power-efficient digital-analog hybrid beam in the multi-antenna system according to claim 5, comprising:
a model initialization module configured to perform mathematical modeling on a hybrid beam forming design to acquire a corresponding optimization problem, the optimization problem comprising three groups of constraint conditions, wherein a first group of constraint conditions is that a value of a transmit power of each antenna is taken in a specified range, a second group of constraint conditions is that values of ripples in a main lobe and a side lobe are taken in a specified range, and a third group of constraint conditions is that a phase value of each phase shifter is taken in a specified set, and an optimization object is to minimize the ripples in the main lobe and the side lobe, and acquire a corresponding analog radio frequency matrix and a digital baseband vector of the hybrid beam forming by solving the optimization problem;

an optimization problem conversion module configured to replace a product of the analog radio frequency matrix and the digital baseband vector in the constraint conditions of the optimization problem by a new optimization variable, transfer a corresponding equality constraint to an objective function using a penalty function method, introduce a multiplier variable for the equality constraint, and convert an original optimization problem into an augmented Lagrange penalty function problem; and an optimization problem solution module configured to use a constrained concave-convex procedure (CCCP) method to convert nonconvex constraints of lower bounds of the constraint of the transmit power of each antenna and the constraint of the ripple in the main lobe in the optimization problem acquired by the optimization problem conversion module into convex constraints, and use a block coordinate descent (BCD) method to solve the optimization problem after constraint conversion.

17. The power-efficient digital-analog hybrid beam forming apparatus in the multi-antenna system according to claim 16, wherein the optimization problem solution module comprises:
a first solution unit configured to fix other optimization variables, construct and solve a first sub-problem taking the analog radio frequency matrix as the optimization variable;
a second solution unit configured to construct and solve a second sub-problem taking the digital baseband vector as the optimization variable;
a third solution unit configured to construct and solve a third sub-problem taking the new optimization variable introduced and a ripple control variable as the optimization variables; and
an iteration control unit configured to sequentially call the three solution units above to solve and update the multiplier variable and a penalty parameter in each iteration until the iteration is converged or a specified number of iterations is met.

18. An apparatus for forming a power-efficient digital-analog hybrid beam in a multi-antenna system for implementing the method for forming the power-efficient digital-analog hybrid beam in the multi-antenna system according to claim 6, comprising:
a model initialization module configured to perform mathematical modeling on a hybrid beam forming design to acquire a corresponding optimization problem, the optimization problem comprising three groups of constraint conditions, wherein a first group of constraint conditions is that a value of a transmit power of each antenna is taken in a specified range, a second group of constraint conditions is that values of ripples in a main lobe and a side lobe are taken in a specified range, and a third group of constraint conditions is that a phase value of each phase shifter is taken in a specified set, and an optimization object is to minimize the ripples in the main lobe and the side lobe, and acquire a corresponding analog radio frequency matrix and a digital baseband vector of the hybrid beam forming by solving the optimization problem;

an optimization problem conversion module configured to replace a product of the analog radio frequency matrix and the digital baseband vector in the constraint conditions of the optimization problem by a new optimization variable, transfer a corresponding equality constraint to an objective function using a penalty function method, introduce a multiplier variable for the equality constraint, and convert an original optimization problem into an augmented Lagrange penalty function problem; and an optimization problem solution module configured to use a constrained concave-convex procedure (CCCP) method to convert nonconvex constraints of lower bounds of the constraint of the transmit power of each antenna and the constraint of the ripple in the main lobe in the optimization problem acquired by the optimization problem conversion module into convex constraints, and use a block coordinate descent (BCD) method to solve the optimization problem after constraint conversion.

19. The power-efficient digital-analog hybrid beam forming apparatus in the multi-antenna system according to claim 18, wherein the optimization problem solution module comprises:

a first solution unit configured to fix other optimization variables, construct and solve a first sub-problem taking the analog radio frequency matrix as the optimization variable;

a second solution unit configured to construct and solve a second sub-problem taking the digital baseband vector as the optimization variable;

a third solution unit configured to construct and solve a third sub-problem taking the new optimization variable introduced and a ripple control variable as the optimization variables; and an iteration control unit configured to sequentially call the three solution units above to solve and update the multiplier variable and a penalty parameter in each iteration until the iteration is converged or a specified number of iterations is met.

\* \* \* \* \*